United States Patent
Hofmann et al.

(10) Patent No.: US 12,498,294 B2
(45) Date of Patent: Dec. 16, 2025

(54) BINOCULAR AUTO-LENSMETER

(71) Applicant: 123 SEE, Inc., Boston, MA (US)

(72) Inventors: Matthias Hofmann, Wayland, MA (US); Jack Moldave, Boston, MA (US)

(73) Assignee: 123 SEE, Inc., Boston, MA (US)

( * ) Notice: Subject to any disclaimer, the term of this patent is extended or adjusted under 35 U.S.C. 154(b) by 166 days.

(21) Appl. No.: 18/100,916

(22) Filed: Jan. 24, 2023

(65) Prior Publication Data

US 2023/0258528 A1    Aug. 17, 2023

Related U.S. Application Data

(60) Provisional application No. 63/302,356, filed on Jan. 24, 2022.

(51) Int. Cl.
    *G01M 11/02*      (2006.01)
    *G06T 7/60*      (2017.01)
    *H04N 17/00*      (2006.01)

(52) U.S. Cl.
    CPC ........... *G01M 11/0264* (2013.01); *G06T 7/60* (2013.01); *H04N 17/002* (2013.01)

(58) Field of Classification Search
CPC ..... G01M 11/0264; G06T 7/60; H04N 17/002
See application file for complete search history.

(56) References Cited

U.S. PATENT DOCUMENTS

| | | | |
|---|---|---|---|
| 4,370,058 A | 1/1983 | Trötscher et al. | |
| 4,730,924 A | 3/1988 | Allard et al. | |
| 4,826,315 A | 5/1989 | Kohayakawa | |
| 5,144,344 A * | 9/1992 | Takahashi | H04N 13/334 351/44 |
| 5,231,460 A | 7/1993 | Kohayakawa | |
| 5,303,022 A | 4/1994 | Humphrey et al. | |
| 5,307,141 A | 4/1994 | Fujieda | |
| 5,331,394 A | 7/1994 | Shalon et al. | |
| 5,349,433 A | 9/1994 | Iwane | |
| 5,847,819 A | 12/1998 | Yanagi | |
| 6,155,682 A * | 12/2000 | Steinberg | G02C 7/14 623/6.35 |
| 6,750,959 B2 | 6/2004 | Daimaru et al. | |

(Continued)

FOREIGN PATENT DOCUMENTS

| CN | 203327180 | * 7/2013 |
|---|---|---|
| CN | 111736696 | * 10/2014 |

(Continued)

OTHER PUBLICATIONS

Toshiro translation of JP 3617805 Jul. 6, 2000 (Year: 2007).*

(Continued)

*Primary Examiner* — Zaihan Jiang
(74) *Attorney, Agent, or Firm* — Gesmer Updegrove LLP

(57) ABSTRACT

A system is disclosed for determining optical correction information of optical equipment. The system includes a camera system for capturing at least one camera image, a target, toward which the camera system is directed, a detection area between the camera system and the target for receiving the optical equipment including at least one lens, and a processing system with a searching routine for determining at least one center of the at least one lens based on the at least one camera image of the target via the optical equipment.

20 Claims, 14 Drawing Sheets

(56) References Cited

U.S. PATENT DOCUMENTS

| | | | |
|---|---|---|---|
| 7,609,371 | B2 | 10/2009 | Kajino |
| 7,733,468 | B2 | 6/2010 | Kajino |
| 7,846,389 | B2 | 12/2010 | Owen et al. |
| 10,330,566 | B2 | 6/2019 | Hofmann et al. |
| 10,416,038 | B2 | 9/2019 | Lemaire et al. |
| 10,485,421 | B1* | 11/2019 | Abou Shousha ...... A61B 3/032 |
| 10,533,925 | B2 | 1/2020 | Goldberg et al. |
| 10,712,233 | B2 | 7/2020 | Limon et al. |
| 10,876,921 | B2 | 12/2020 | Limon et al. |
| 2002/0085196 | A1 | 7/2002 | Fukuma et al. |
| 2003/0043367 | A1 | 3/2003 | Kajino |
| 2005/0219514 | A1 | 10/2005 | Imaizumi |
| 2011/0051076 | A1* | 3/2011 | Sugihara ................ G02C 7/086 351/158 |
| 2013/0208092 | A1* | 8/2013 | Rollet .................... G06T 15/04 348/46 |
| 2016/0202141 | A1 | 7/2016 | Zhou |
| 2016/0357032 | A1* | 12/2016 | Cabeza-Guillen ... G02C 13/005 |
| 2018/0195931 | A1 | 7/2018 | Lemaire et al. |
| 2018/0239174 | A1 | 8/2018 | Schön |
| 2019/0094552 | A1* | 3/2019 | Shousha ................ A61B 3/024 |
| 2019/0391398 | A1* | 12/2019 | Abou Shousha ...... A61B 3/113 |
| 2020/0201070 | A1 | 6/2020 | Lerm et al. |
| 2020/0225508 | A1 | 7/2020 | Kittenplon et al. |
| 2022/0397389 | A1* | 12/2022 | Teodorovic ............... G06T 7/62 |
| 2023/0128758 | A1 | 4/2023 | Hoffmann et al. |

FOREIGN PATENT DOCUMENTS

| | | | |
|---|---|---|---|
| CN | 107132030 | A | 9/2017 |
| CN | 108204889 | A | 6/2018 |
| CN | 116724286 | * | 12/2021 |
| CN | 118354710 | A | 7/2024 |
| CN | 118575068 | A | 8/2024 |
| EP | 0363281 | A2 | 4/1990 |
| EP | 3320830 | A1 | 5/2018 |
| ES | 2232895 | * | 3/1998 |
| JP | 3617805 | * | 7/2000 |
| JP | 2005506107 | A | 12/2008 |
| JP | 2018163104 | A | 10/2018 |
| WO | 2017021480 | A1 | 2/2017 |
| WO | 2023069734 | A1 | 4/2023 |
| WO | 2023141356 | A1 | 7/2023 |

OTHER PUBLICATIONS

Shibata translation of ES 2232895 Mar. 27, 1998 (Year: 1998).*
Nakagawa translation of CN 111736696 Oct. 24, 2014 (Year: 2014).*
Goodrich translation of CN 116724286 Dec. 15, 2021 (Year: 2021).*
Huang translation of CN 203327180 Jul. 22, 2013 (Year: 2013).*
Andre, Characterization of the optical properties of progressive addition lenses (PALs) using root mean square of the power error (RMSPE), 2010, 104 pages, College of Optometry, Paper 1.
Buah-Bassuah et al., Simple portable lens meter, vol. 42, No. 25, Sep. 1, 2003, Applied Optics, pp. 5086-5090.
Park, et al., Characteristic and fabrication of auto-lensmeter using with personal computer, *Journal of Korean Ophthalmic Optics Society*, 2001, pp. 31-35, 5 pages.
Communication pursuant to Rules 161(1) and 162 EPC issued by the European Patent Office in related European Patent Application No. 23706903.4 on Sep. 3, 2024, 3 pages.
Communication pursuant to Rules 161(1) and 162 EPC issued by the European Patent Office in related European Patent Application No. 22814229.5 on Jun. 6, 2024, 3 pages.
International Preliminary Report on Patentability issued by the International Bureau of WIPO in related International Application No. PCT/US2022/047459 on Apr. 23, 2024, 10 pages.
International Preliminary Report on Patentability issued by the International Bureau of WIPO in related International Application No. PCT/US2023/011436 on Jul. 30, 2024, 9 pages.
Annex to Form PCT/ISA/206, Communication Relating to the Results of the Partial International Search, issued by the European Patent Office (as the International Searching Authority) in related International Application No. PCT/US2022/047459 on Feb. 7, 2023, 2 pages.
Notification of Transmittal of the International Search Report and the Written Opinion of the International Searching Authority along with the International Search Report and Written Opinion of the International Searching Authority issued in related International Application No. PCT/US2023/011436 on May 19, 2023, 15 pages.
Notification of Transmittal of the International Search Report and the Written Opinion of the International Searching Authority along with the International Search Report and Written Opinion of the International Searching Authority issued in related International Application No. PCT/US2022/047459 on Mar. 28, 2023, 19 pages.

* cited by examiner

BINOCULAR AUTO-LENSMETER

PRIORITY

The present application claims priority to U.S. Provisional Patent Application No. 63/302,356 filed Jan. 24, 2022, the disclosure of which is hereby incorporated by reference in its entirety.

BACKGROUND

The invention generally relates to lensmeters and relates to automated lensmeters for determining optical properties of spectacle lenses.

Lensmeters have long been used by opticians and vision care professionals to measure the refractive settings of spectacle lenses (the spectacle prescription, Rx: sphere, cylinder, and axis). The two common configurations are the manual lensmeter shown at 10 in FIG. 1A (e.g., see U.S. Pat. No. 4,730,924 and FIG. 1 of U.S. Pat. No. 10,533,925) and the auto-lensmeter shown at 20 in FIG. 1B (e.g., see U.S. Pat. Nos. 5,349,433, 7,609,371 and EP 0363281). Both types of lensmeter configurations require significant training for proper usage and measurement. Even to the trained user, measurement error due to incorrect spectacle lens placement or improper fixturing of the spectacles is a common occurrence that prompts re-measurement to confirm the result. These two techniques may also take over 1 minute for proper result readout of both lenses of a spectacle since these techniques only measure one lens at a time. Single lens measurement also makes finding the pupillary distance (PD)—the distance between the axial centers of the lens pair—a cumbersome task that is prone to additional user or measurement error even for trained users. Historically, both of these systems were designed for spectacle professional use, not for untrained users.

Although lensmeters for use by non-spectacle professionals (e.g., U.S. Patent Publication No. 2016/0202141, which is disclosed to be used in combination with a mobile communication device), have been proposed, such system have not been found to be sufficiently accurate in all applications, and generally require that a user move the mobile communication device and/or the spectacles to generate a collection of data from which distances may be determined.

There remains a need therefore for an improved lensmeter system that may be quickly and readily used to find accurate optical information regarding a user's spectacles.

SUMMARY OF THE INVENTION

In accordance with an aspect, the invention provides a system for determining optical correction information of optical equipment. The system includes a camera system for capturing at least one camera image, a target, toward which the camera system is directed, a detection area between the camera system and the target for receiving the optical equipment including at least one lens, and a processing system with a searching routine for determining at least one center of the at least one lens based on the at least one camera image of the target via the optical equipment.

In accordance with another aspect, the invention provides a method of determining optical correction information of optical equipment including at least one lens. The method includes positioning the optical equipment in a detection area, capturing at least one camera image with a camera system, said at least one camera image including an image of a target through the optical equipment in the detection area, and determining at least one center of the lens using a searching routine based on the at least one image of the target via the optical equipment In accordance with a further aspect, the invention provides a system for determining optical correction information of optical equipment. The system includes a camera system for capturing at least one camera image for capturing successive images, a target, toward which the camera system is directed, a detection area between the camera system and the target for receiving the optical equipment including at least one lens, and a processing system with a searching routine for determining at least one center of the at least one lens based on the successive images of the target via the optical equipment

BRIEF DESCRIPTION OF THE DRAWINGS

The following description may be further understood with reference to the accompanying drawings in which.

The drawings are shown for illustrative purposes only.

DETAILED DESCRIPTION

Figure 1B:
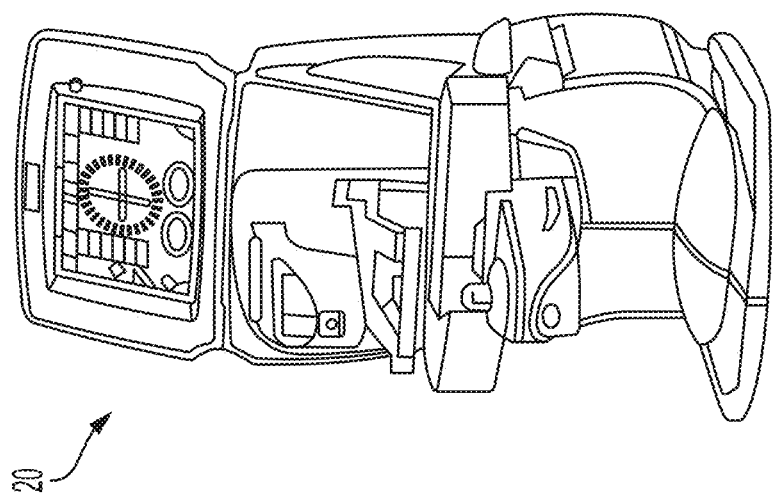
FIGS. 1A and 1B show illustrative diagrammatic views of lensmeters of the prior art, showing a manual lensmeter (FIG. 1A) and an auto-lensmeter (FIG. 1B)
Figure 1A:
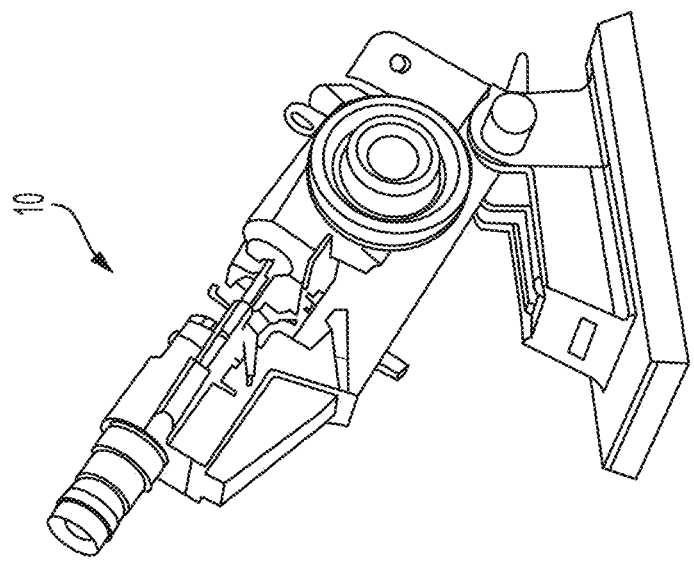

Disclosed herein are lensmeter configurations and accompanying algorithms that significantly simplify measurement of both lenses in spectacles to a degree that allows untrained and unskilled users to perform complete spectacle lens measurements with high accuracy, repeatability, and at readout speeds that are 1 or 2 orders of magnitudes faster than the traditional methods discussed above with reference to FIGS. 1A and 1B. The disclosed binocular auto-lensmeter techniques and accompanying algorithms may be a component of a self-serve kiosk or a component of a standalone apparatus for public locations such as optical stores, supermarkets, pharmacies, and shopping centers that allows untrained users or untrained store personnel to measure the prescription values (Rx) and pupil distance (PD) of spectacles. The binocular auto-lens meter and accompanying algorithms can measure the settings of single vision, bifocal, standard progressive, and no-line progressive lenses. The Rx consists of spherical correction (SP), cylindrical correction (CY), axis of cylinder (AX), reading correction add (ADD), prism shift (PR), as well as segment height in progressive lenses.

Figure 2:
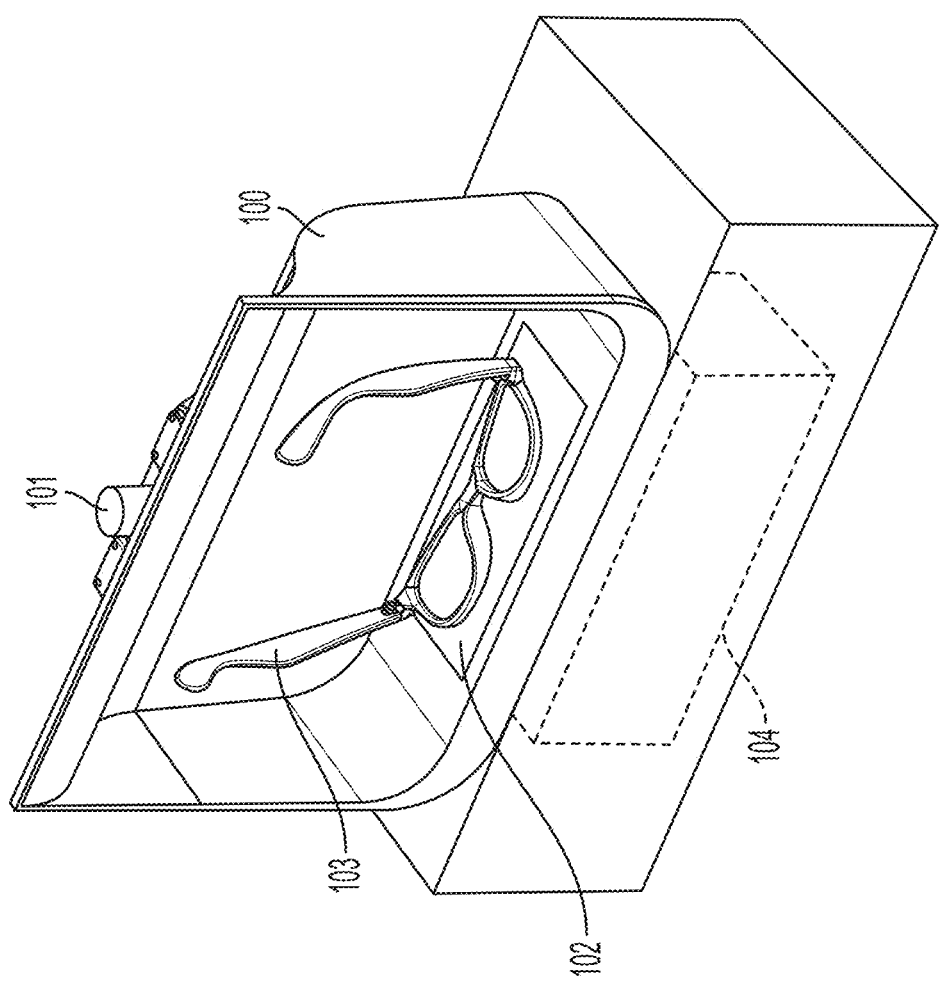
FIG. 2 shows an illustrative diagrammatic view of a lensmeter system in accordance with an aspect of the present invention.

Configurations:

The system in accordance with an aspect of the invention generally consists of four components when in use: a fixture 100 that holds a camera system 101 and a target 104 below a transparent platform 102; and a pair of spectacles 103 located between the camera system 101 and the target 104 on the transparent platform 102 as shown in FIG. 2. The spectacles 103 are positioned on a transparent platform (as also shown in FIG. 3) such that the camera is directed through the lenses, through the transparent platform and to the target 104.

The working principle of this configuration is that the camera system 101 records images of the target 104. As soon as the spectacles are held between the camera system 101 and the target 104, the image of the target as recorded by the camera system distorts. The distortion of the target image can be used to deduce the Rx and PD parameters of the spectacles. The remainder of this Section provides more detail on each component in this configuration and how they may be used in calculating Rx and PD.

Figure 3:
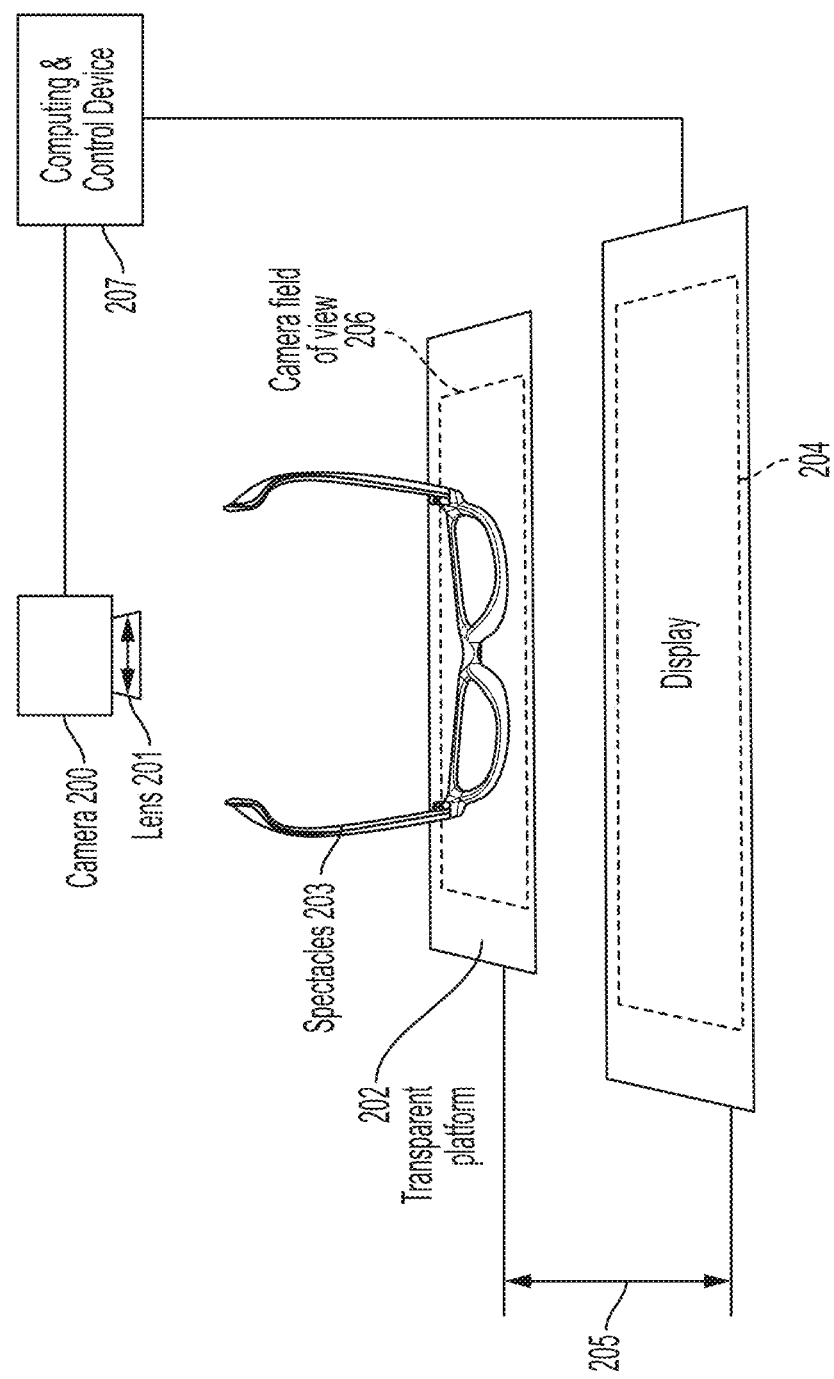
FIG. 3 shows an illustrative diagrammatic function view of a fixture system for operating the system of FIG. 2, that includes a transparent platform.

In illustrative implementations of this invention in FIG. 3, the camera system 101 consists of a digital camera 200 and a lens 201 to focus the image from the target plane 204 to the sensor plane of the digital camera 200. The digital camera 200 sensor may consist of a CCD or CMOS-based chip.

As noted above, in some implementations, there may be a transparent platform 202 between the camera system 101 and the target 104 to place the spectacles on, which provides a stable surface with a known position and distance 205 between the spectacle lenses and the target 104. The transparent platform 202 may me made of glass or plastic (e.g., acrylic) and may be transparent across the visible wavelength spectrum or may be transparent only in a specific wavelength range (e.g., 700 nm-900 nm). The known distance 205 may be used as an invariable reference distance in the calculation of Rx and PD. The camera lens 201 is selected such that a camera field of view is generated 206 that encompasses both spectacle lenses when the spectacles 203 are placed on the transparent platform 202. The system records camera images of patterns with and without the transparent platform such that any diffraction caused by the transparent platform may be removed from calculations of optical parameters including one or more centers of each lens.

In some implementations, the transparent platform 202 may be split into two sections, one section for each lens of the spectacles 203. In between the two sections may be a slight depression so that the nose bridge of the spectacles 203 can conform more optimally for stable placement of the spectacles 203 on split transparent sections. The images and patterns tracked from the camera 214 may be used in the same manner as with the images and patterns tracked from camera 200.

In some implementations, the target 104 may be a static image, pattern, or graphic. The target graphic may consist of a sticker, may be etched into a plate, or may be projected from a light source beneath or above the target plane 104.

In other implementations, such as illustrated in FIG. 3, the target 104 may consist of an electronic display 204 such as an LCD or OLED screen that can provide dynamic moving images, patterns, or graphics before, during, and after the measurement session. The display 204 and camera system 101 are connected to a computing & control device 207 that manages the interaction between the two components. The system may determine an optical center of each lens by any of the searching routines discussed below.

Figure 4:
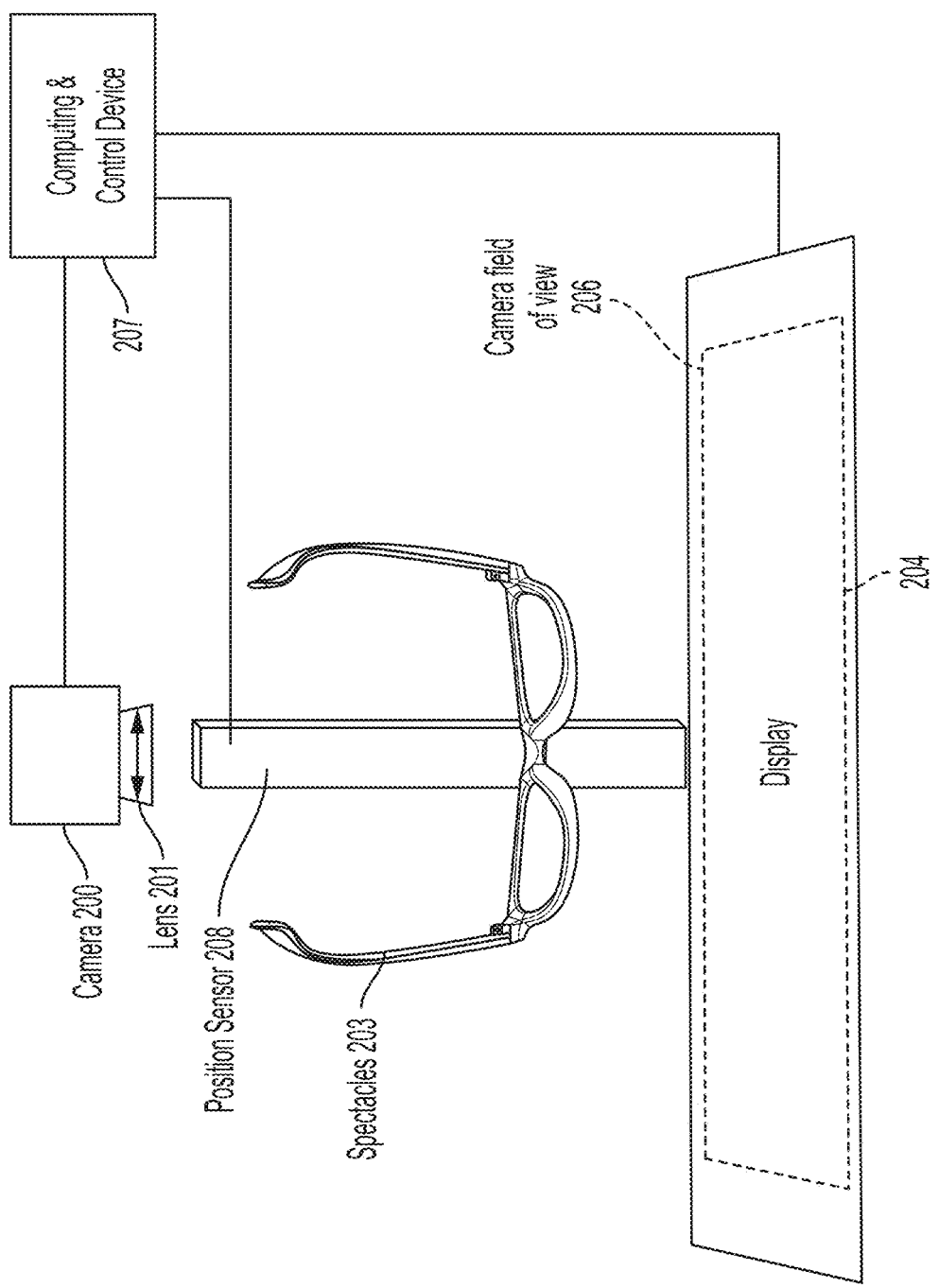
FIG. 4 shows an illustrative diagrammatic functional view of a fixture system for operating the system of FIG. 2, that includes a position sensor system.

In some implementations of this invention, there is no transparent platform 202 between the camera system 101 and the target 104. In the cases where the position of the spectacle lenses 203 between camera 101 and target 104 are required for result calculation of Rx and PD, a position sensor 208 may be included in the fixture 100 as shown in FIG. 4. The position sensor may include proximity sensors along the vertical rise of the position sensor 208.

In particular, the position sensor 208 may be an inductive-based sensor bar that can locate the frame position 205 of the spectacles 203 with respect to the path between the camera 101 and the target 104, as illustrated in FIG. 4. The position sensor 208 may also be a mechanical lever on a spring that is pushed down with the spectacles 203 such that the position of the spectacles 205 can be measured during the lens meter measurement session. Again, the system may determine an optical center of each lens by any of the searching routines discussed below.

Figure 5:
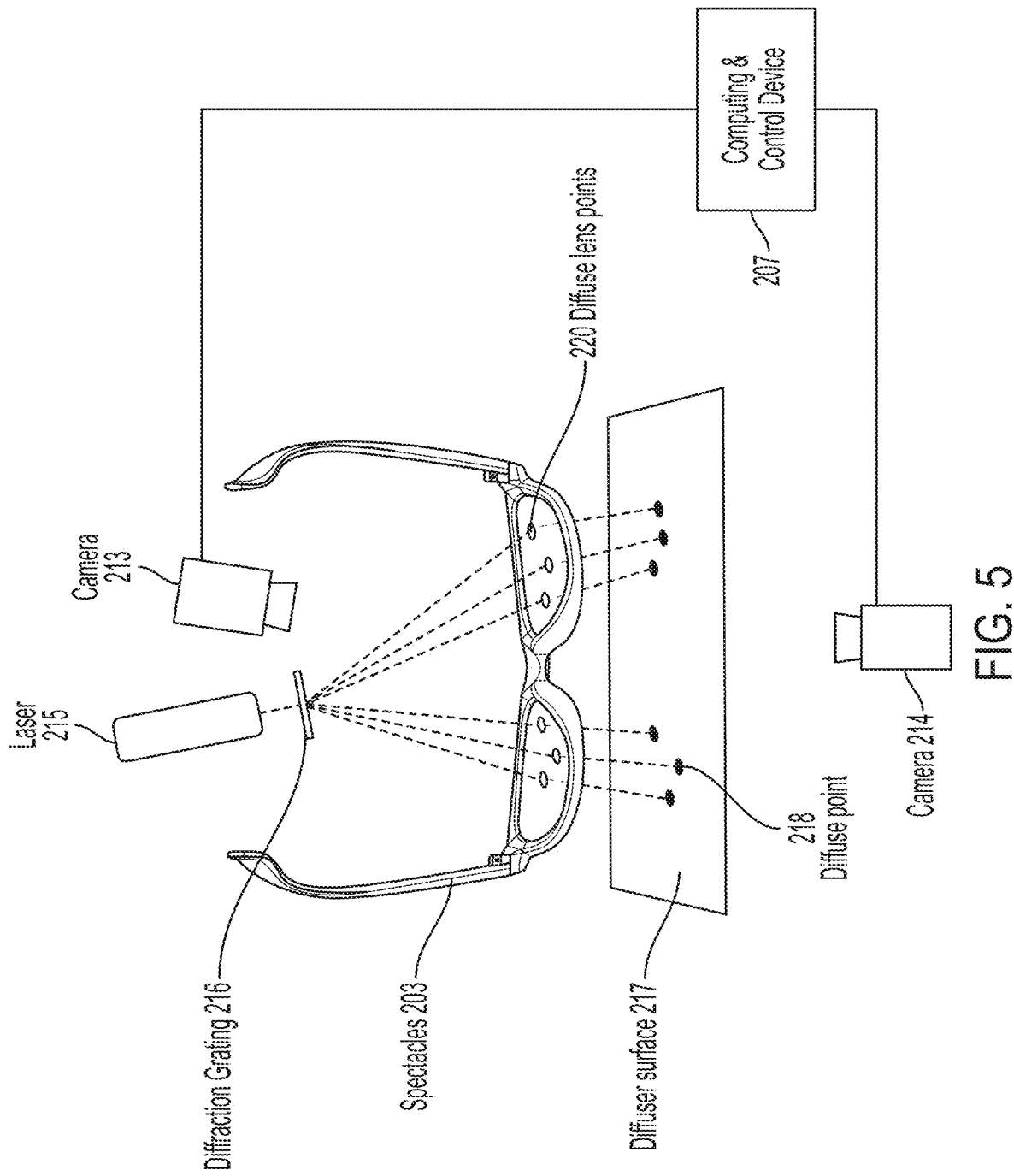
FIG. 5 shows an illustrative diagrammatic functional view of a fixture system for operating the system of FIG. 2, that includes a light source for generating multiple light rays simultaneously.

In some implementations, a laser 215 and diffraction grating 216 may be positioned such that multiple light rays are produced simultaneously that traverse through the spectacle lenses 203 as described in FIG. 5. One of two cameras 213 are positioned near the laser to observe the diffuse lens points 220 produced on the lenses by the laser rays. A second camera 214 is placed below a diffuser surface 217. The diffuser surface 217 produces diffuse light points 218 from the laser rays and may be observed and tracked by the second camera 214. The diffuser surface 217 may be comprised of a thin opaque plastic sheet. The diffuser surface is used instead of a display 204 to track pattern distortion produced by the spectacle lenses 203. The system may determine an optical center of each lens by any of the searching routines discussed below.

Figure 6A:
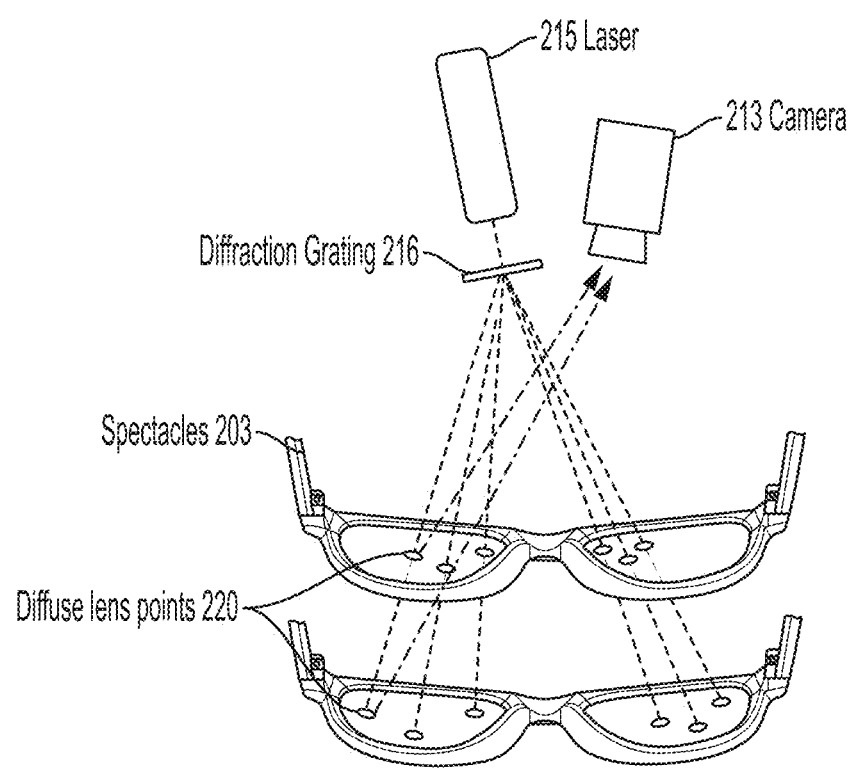
FIGS. 6A-6C show illustrative diagrammatic views of a position detection system for use in the lensmeter of FIG. 2, with FIG. 6A showing a fixture system for operating the system of FIG. 2, that includes a position sensing system, a first pattern on an inside of a spectacle lens (FIG. 6B), and a second pattern on the inside of the spectacle lens (FIG. 6C) at a greater distance.
Figure 6B:
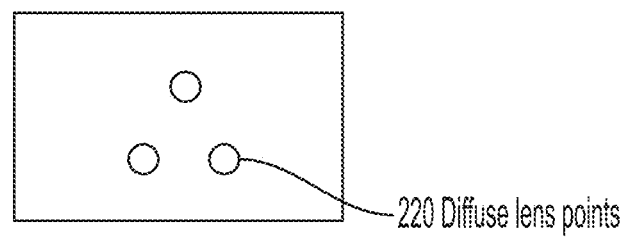
Figure 6C:
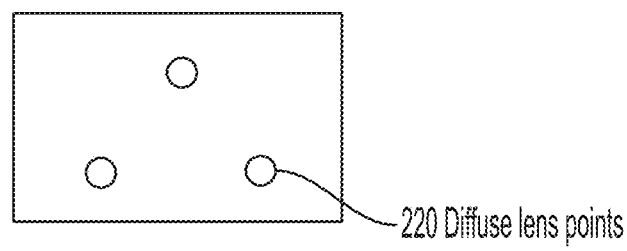

In some implementations, the diffuse reflections 220 on the lenses caused by the light rays from the diffraction grating 216 may be tracked by camera 213 as illustrated in FIG. 6A. The distance between diffuse lens points 220 may be used to determine the position of the lenses with respect to the rest of the fixture. If the spectacles 203 are near the diffraction grating 216 the diffuse lens points will be closer together (as shown in FIG. 6B) than the when the spectacles 203 are far from the diffraction grating 216 (as shown in FIG. 6C). The distance of the spectacle lenses from the camera may thereby be determined based on the spreading of the points. The system may determine an optical center of each lens by any of the searching routines discussed below.

In some implementations, instead of a diffraction grating, a galvanometer mirror 219 may be used to steer the laser light 215 to different positions on the spectacle lenses 203. The compute and control system 207 may turn the laser 215 on/off and move the galvanometer mirror to create dots at different positions on the spectacle lenses 203. The laser ray traverses through the spectacle lenses and reaches the diffuser surface 217. The position of each diffuse point 218 may be tracked by the second camera 214 to determine the parameters of the lenses as described below.

Figure 7:
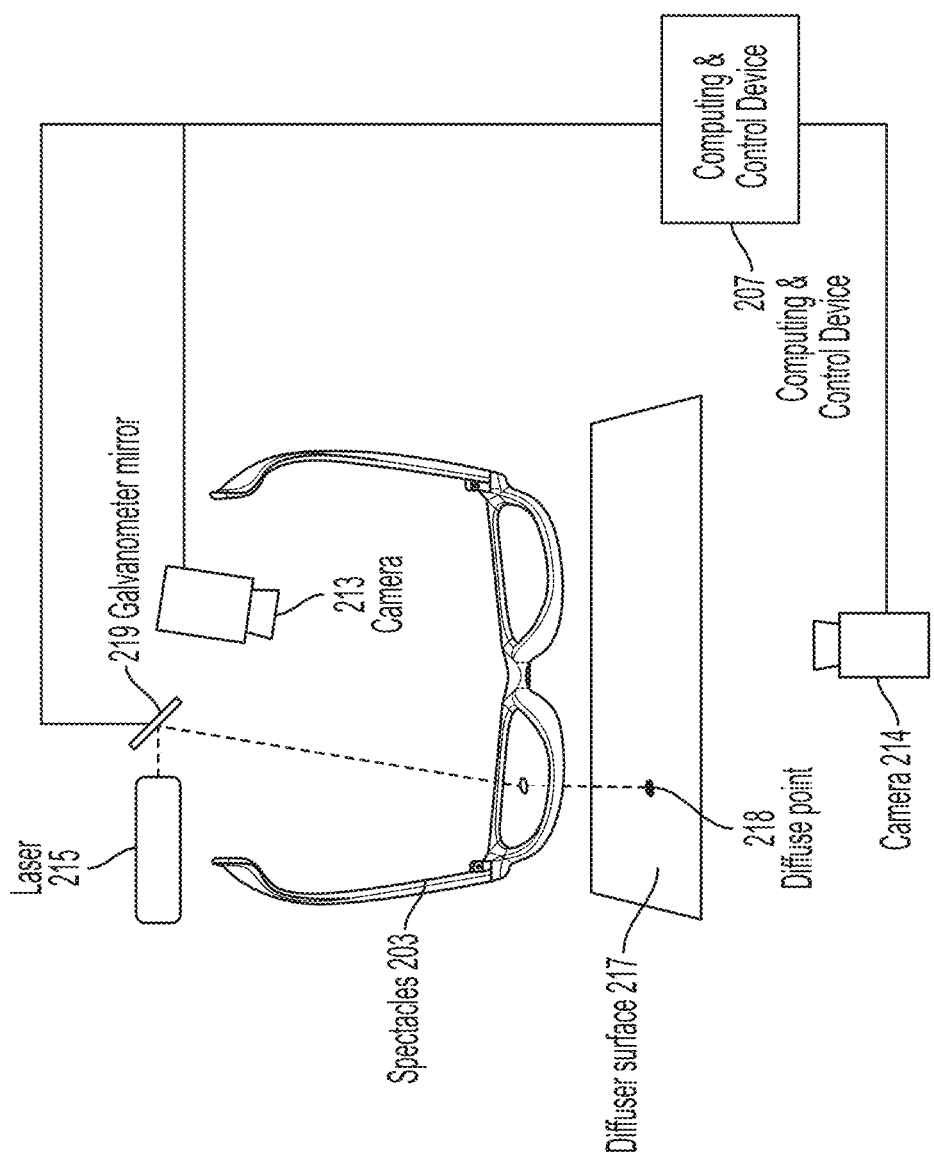
FIG. 7 shows an illustrative diagrammatic functional view of a fixture system for operating the system of FIG. 2, that includes a scanning laser source for generating a pattern of source images.

In other implementations, the second camera 214 observes the diffuse points 218 on the diffuser surface 217 as shown in FIG. 7. Depending on the position of these diffuse points when the spectacles are present, or not present (calibration), the parameters of the lenses can be determined as described below by having the system capture a plurality of images associated with each position of the galvanometers and therefore the image spot as the image spot is moved. The system may determine an optical center of each lens by any of the searching routines discussed below.

The target 104 may consist of a repeating pattern such as a checkerboard pattern, a CharuCo pattern, a dot grid pattern, a circle grid pattern, or a grid pattern with multi-color features. These target configurations enable the camera to locate distinct fiducial locations on the target plane and track the movement of the fiducials as the spectacles are inserted within the lensmeter fixture. Using a dynamic target display 204, the positions, colors, and patterns of each fiducial can be changed before, during, and after a measurement session. For example, a dot pattern may first be displayed in a low-density arrangement and subsequently in a higher density configuration as the measurement takes place in order to refine the measurement's accuracy or to find the optical centers of the lenses (described below).

Figure 8:
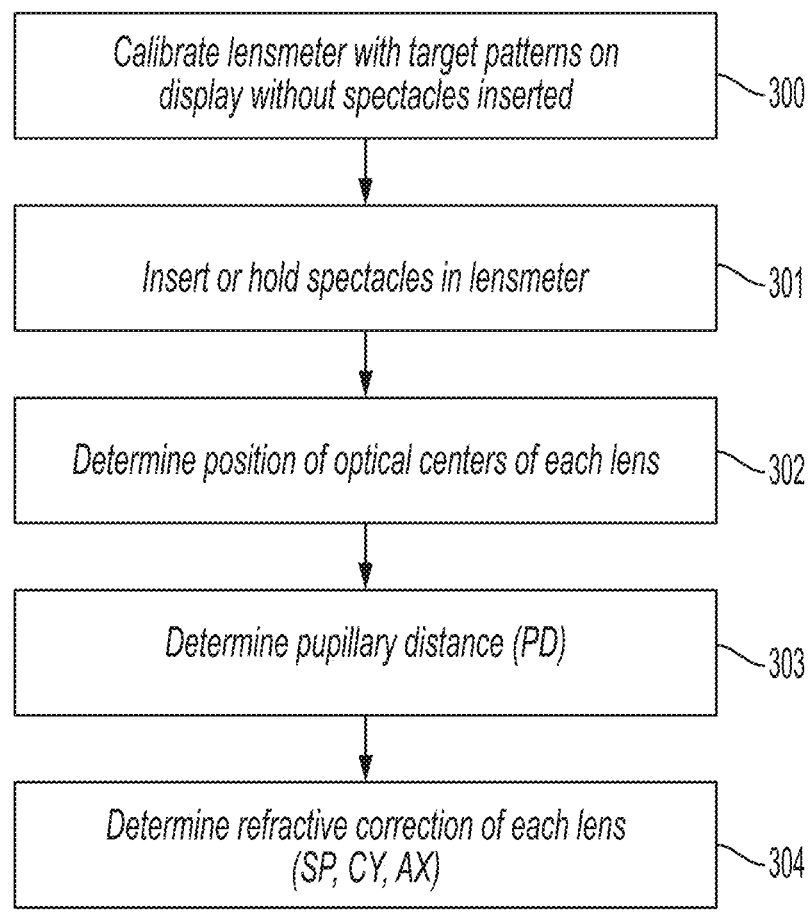
FIG. 8 shows an illustrative diagrammatic view of processing steps in a lensmeter system in accordance with an aspect of the invention.

Searching Routines:

With reference to FIG. 8, in Step 1 (300), the camera system 101 first takes an image of the target 104 pattern without the spectacles being placed into the fixture 100—this is the calibration image. This calculation takes into account the net diffraction of the light as it travels through the transparent platform 102. In accordance with further aspects, the calibration may further be performed with and without the transparent platform to further identify the amount of net diffraction caused by the transparent platform. The fiducial positions of the calibration image are stored in memory for later use. In Step 2 (301), the spectacles are inserted or placed into the fixture 100 between the camera system 101 and the target 104, again optionally on the transparent platform 102. A continuous camera stream may be fed to the compute and control device 207 such that a change in image may be detected, indicating the presence of the spectacles and that this step has initiated. Alternatively, a mechanical switch or level may be pressed by the spectacles that indicates their presence to the compute and control device 207. In Step 3 (302), the compute and control device takes an image (measurement image) from the camera 101, finds the fiducial positions, and compares their position to that of the positions of the fiducials in the calibration image. Each fiducial has thus a calibration position and a measurement position along the target 104 plane forming a fiducial before-after position pair. With the fixtures described in FIG. 3, FIG. 4, FIG. 5, and FIG. 7 the position of the spectacles 103, camera 101, and target pattern 104 are known with respect to each other. If all positions are known, the general algorithm can be accomplished in as little as two images from the feature tracking camera—with first image being the calibration image without the presence of lenses, and the second image being the image with presence of lenses from the spectacles 103.

During the measurement of the spectacle lenses, the positional shift along the target 104 plane of each fiducial pair may be tracked by the compute and control device 207. This enables the detection of the axial centers of each spectacle lens and is described in more detail below. Finally, in Step 5 (304), using the axial centers on each lens the Rx is determined. Specific details regarding Steps 3, 4, and 5 are described further below.

Finding Axial Centers (Step 302):

Two techniques are described to find the axial center of a spectacle lens and are outlined in FIGS. 9A-9D and FIGS. 10A-10E.

Figure 9A:
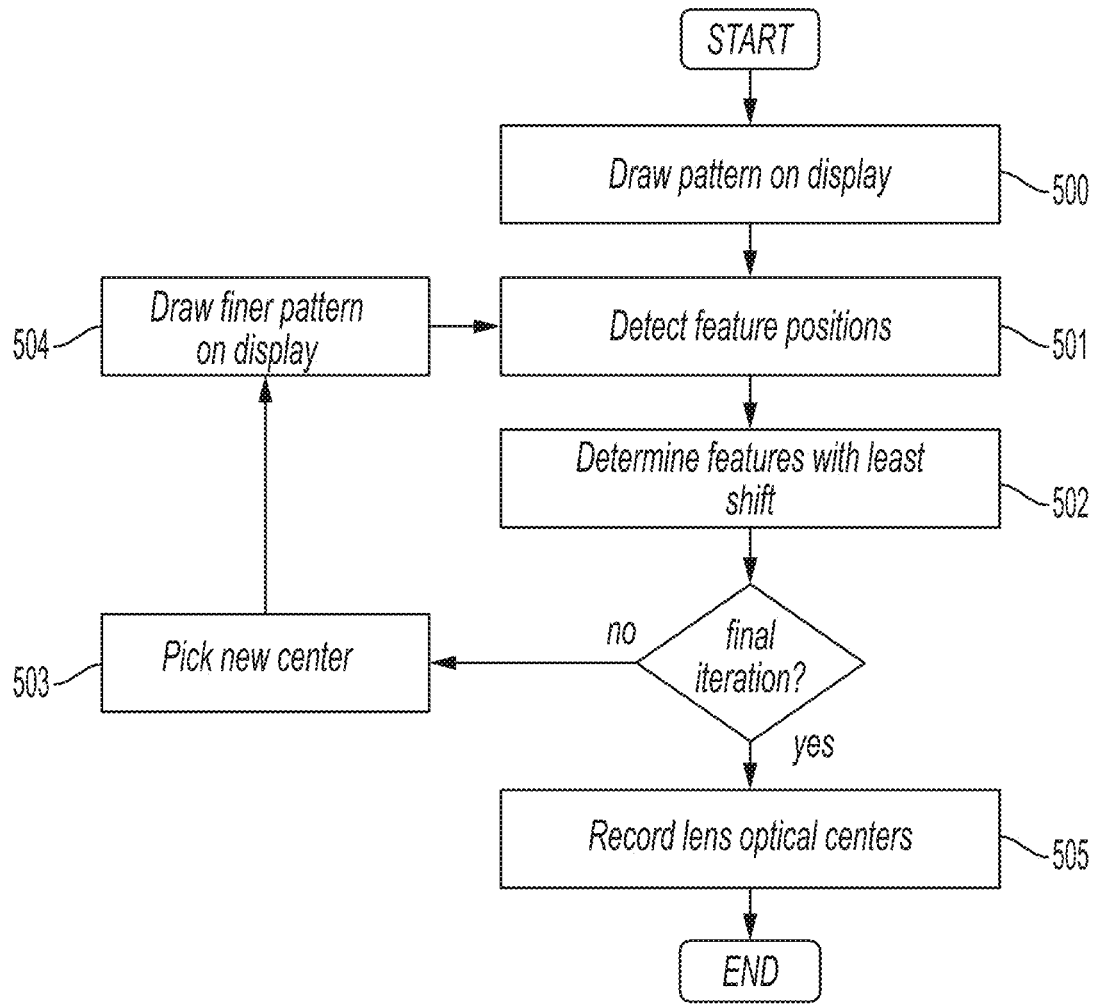
FIGS. 9A-9D show illustrative diagrammatic views of center(s)-of-lens detection system used in a lensmeter system in accordance with an aspect of the present invention involving iterative pattern processing, showing processing steps (FIG. 9A), showing a first iteration of dot processing (FIG. 9B), showing a further iteration of dot processing (FIG. 9C), and showing a determined distance between centers of two lenses (FIG. 9D)
Figure 9B:
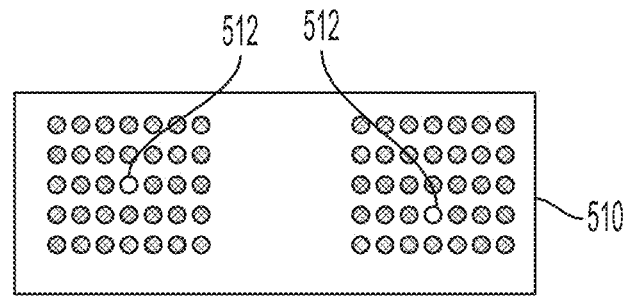
Figure 9C:
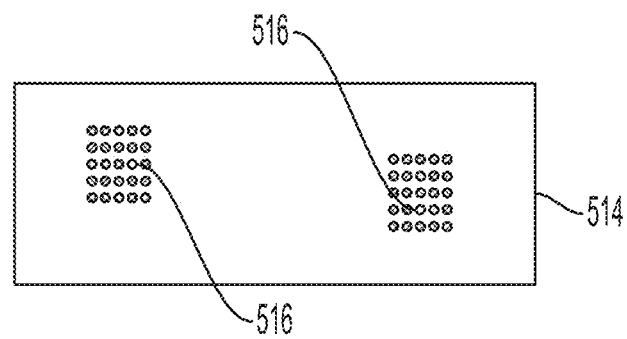
Figure 9D:
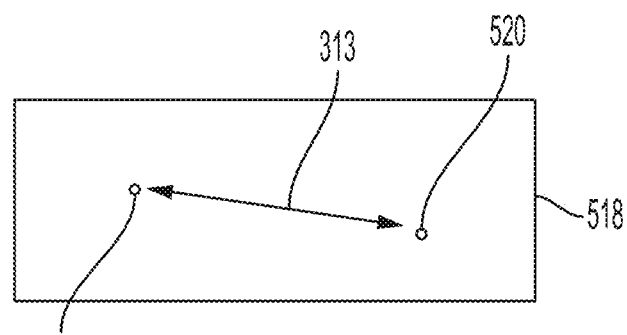

With reference to FIG. 9A first axial center finding technique begins (Step 500) by providing a pattern on the display. As shown in FIG. 9B, the pattern 510 includes a pattern set for each lens. Next, the fiducial positions on that pattern are found (Step 501) and compared to the original positions from the calibration image. For each lens, the fiducial with the least amount of positional shift as compared to the respective calibration image fiducial is selected (Step 502). The system provides that plural iterations of this process may be employed at finer resolutions. The determined fiducial position may be used as the axial center of a lens (Step 505), or if further refinement is desired the selected fiducial position is used as the provisional axial center for a subsequent refinement iteration (Steps 503-504). In the later case, a finer grid pattern 516 is drawn by the display 514 over the provisional center 512 as shown in FIG. 9C, and again, the fiducial with the least amount of shift compared to a calibration image is selected for each lens. This process may be repeated until the fiducial movement over the candidate axial center is less than a certain preselected cutoff distance, after which the final axial center positions are selected as shown at 518 in FIG. 9D, which shows the lens centers 520 a determined distance apart 313.

Figure 10A:
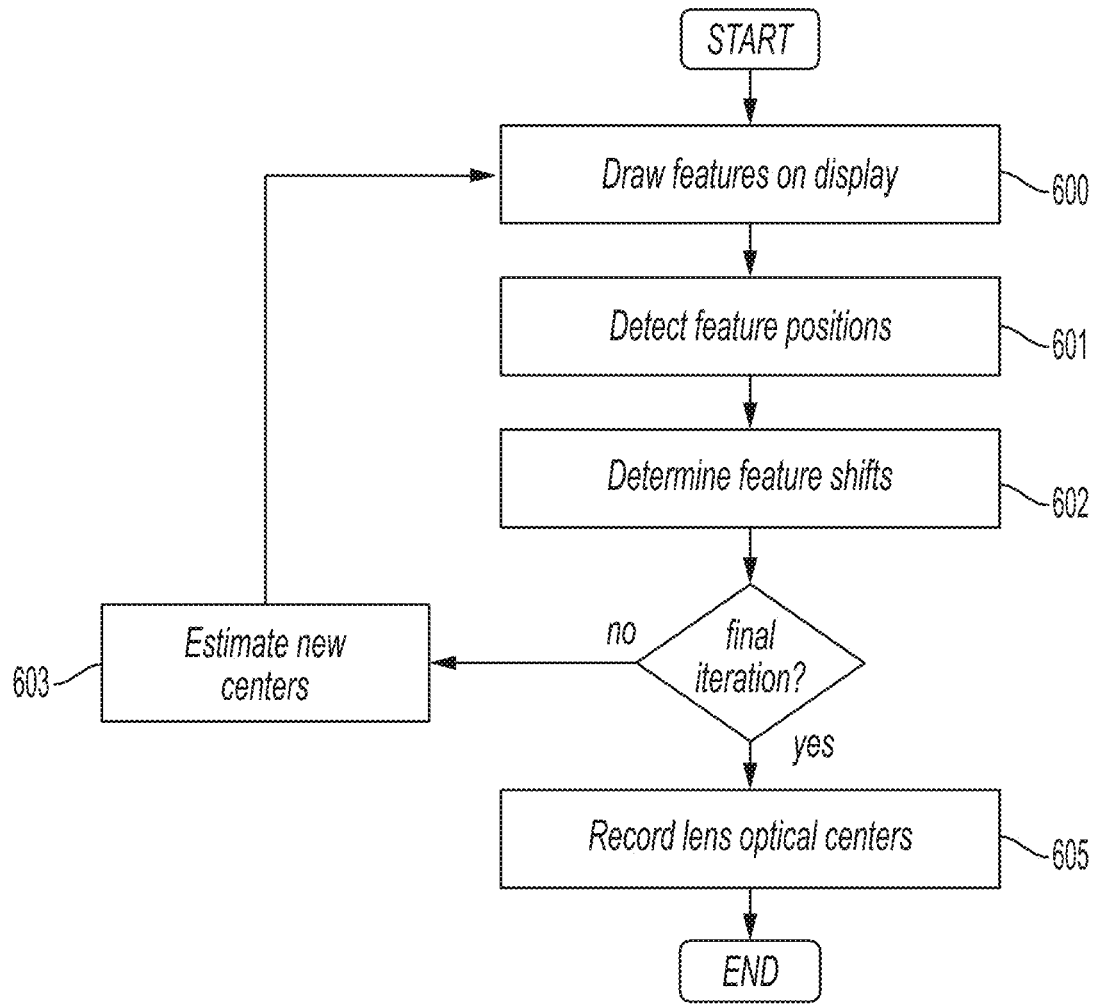
FIGS. 10A-10E show illustrative diagrammatic views of center(s)-of-lens detection system used in a lensmeter system in accordance with an aspect of the present invention involving repeated point imaging, showing processing steps (FIG. 10A), showing a first set of imaged points (FIG. 10B), showing a second set of imaged points (FIG. 10C), showing a third set of imaged points (FIG. 10D), showing a fourth set of imaged points (FIG. 10D), and showing a determined distance between centers of two lenses (FIG. 10E)
Figure 10B:
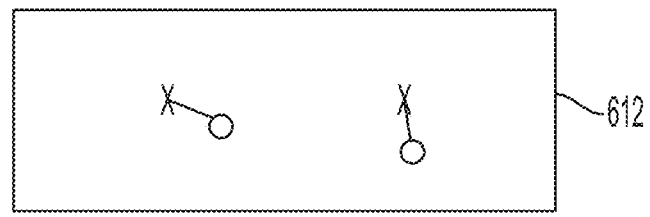
Figure 10C:
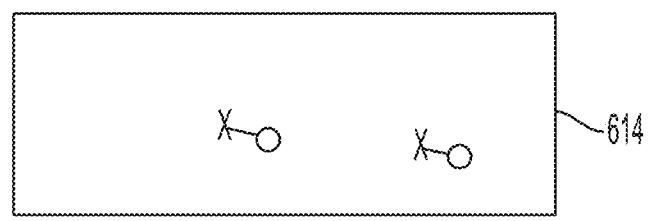
Figure 10D:
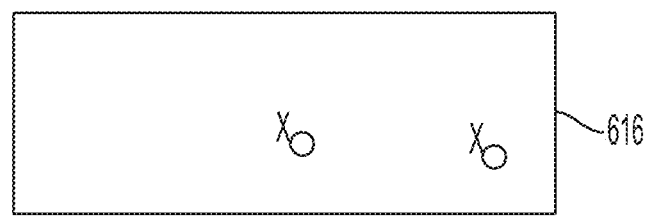
Figure 10E:
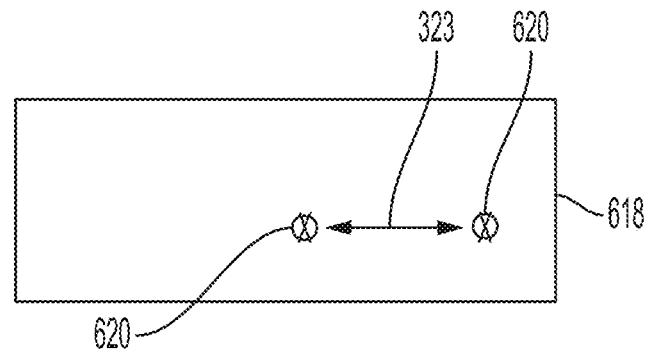

With reference to FIG. 10A, a second axial center finding technique involves first drawing a fiducial point on the display (Step 600) and then recording this fiducial position on the target plane prior to inserting the spectacles 203 into the fixture 100. This this creates a fiducial calibration position. After the spectacles 203 are inserted into the fixture 100, the positional shift of the fiducial in the measurement image (shown at 612 in FIG. 10B) is recorded and compared to the calibration fiducial position. Any shifts in position are determined (Step 602). And if the shift distance is shorter than a pre-determined cutoff length, the measurement fiducial position is used as the axial center of the lens. If the distance is greater, the calibration fiducial position to be drawn by the display is set as the prior found measurement position fiducial (Step 603) as shown at 614 in FIG. 10C. This process is repeated (as shown at 616 in FIG. 10D), making the calibration fiducial "follow" the measurement fiducial until the distance between the two are below the pre-determined cutoff distance, after which the final measurement position is selected as the axial center of the lens (Step 605), providing lens centers 620 at a determined distance apart 323, as shown in FIG. 10E.

Figure 11:
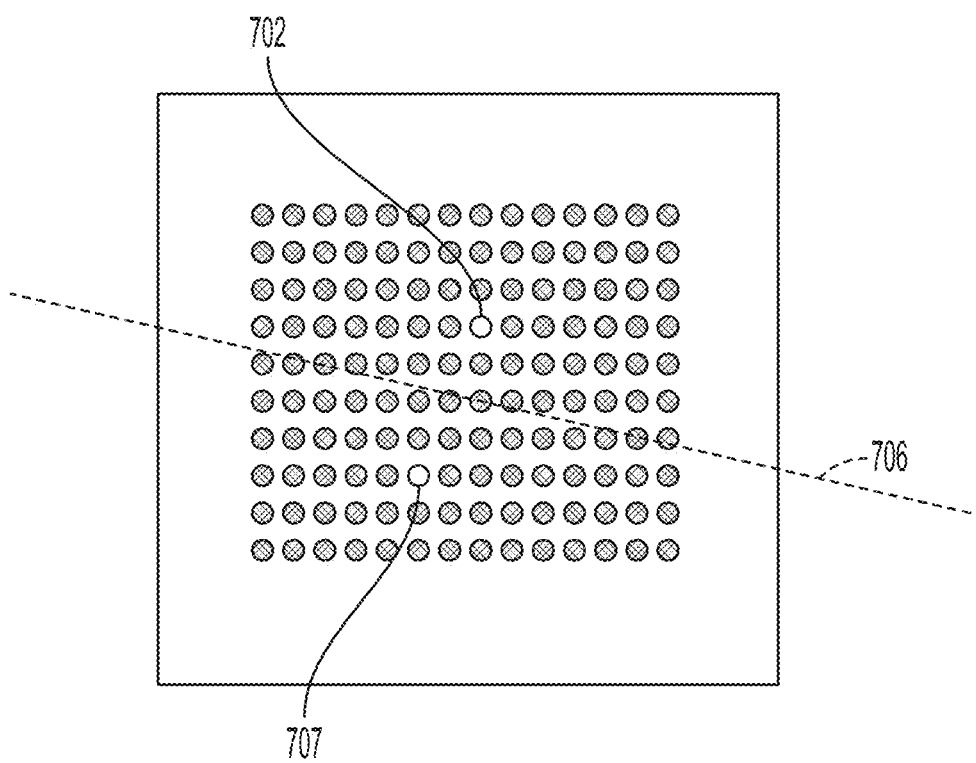
FIG. 11 shows an illustrative diagrammatic view of processing point locations for a lens that includes more than one center of the lens, such as for bifocal or processive lenses.

These techniques may be repeated for each lens and may also be done simultaneously on different parts of the target plane for each respective lens of the spectacles 203. These techniques may be used with bifocal or progressive lenses. There may be two fiducial positions with minimal displacement, indicating two axial centers 702 and 707 and segment height position 706 as shown in FIG. 11. For two or more prospective axial centers, the "follow" technique may be used to further refine the fiducial position placement.

Finding Pupil Distance (Step 303):

Once the axial centers of each lens are found, the pupil distance (PD) can be calculated from the system geometry. The axial center of a lens does not cause any refractive bending of light rays, thus a straight line can be traced from the camera system 101 to the target plane through each lens axial center creating two trace lines. The lines intersect the spectacle lens plane. The spectacle lens plane is located a known distance D2 (205) from the target plane, and a known distance D1 from the camera system 101. After a center finding algorithm is completed for each lens, the final fiducial position of the lens center for each lens is known on the target plane giving a distance P1. The pupil distance (PD) follows from the geometric ratio: $PD = P1 \times D1/(D1+D2)$.

Conversion to Diopters (Step 304):

For each axial center found during a measurement session, a subsequent pattern or shape may be displayed around the axial center by the target display 204. In some cases a circle with radius r may be drawn around the axial center. The distortion of the circle by the lens may form an ellipse, with a major axis length a, a minor axis length b, and an angle of distortion c. Two ratios may be calculated during a measurement session, the major axis distortion ratio $R1 = a/r$ and minor axis distortion ratio $R2 = b/r$.

Prior to the measurement session, a calibration curve is determined and placed in memory of the compute and control device 207 that maps distortion ratio to diopters. A calibration curve may be generated, where the points represent calibration points and the line a regression with best fit polynomial. The best fit polynomial can be described as a conversion function D(R) that takes ratio R as input and gives diopter D as output. The calibration curve may only be valid for a given camera-lens distance and lens-target distance 205, thus a unique calibration curve may be needed for specific combinations of system distance configurations.

The prescription of a given lens may be calculated as such: $SP = D(R2)$; $CY = D(R1 - R2)$; $AX = \mod(c, 180)$, where the mod(·) function is the modulus 180 of the angle of distortion. FIG. 11 shows an illustrative diagrammatic view of processing point locations for a lens that includes more than one center of the lens, such as for bifocal or processive lenses.

Definitions

The terms "a" and "an", when modifying a noun, do not imply that only one of the noun exists. For example, a statement that "an apple is hanging from a branch": (i) does not imply that only one apple is hanging from the branch; (ii) is true if one apple is hanging from the branch; and (iii) is true if multiple apples are hanging from the branch.

To say that a calculation is "according to" a first equation means that the calculation includes (a) solving the first equation; or (b) solving a second equation, where the second equation is derived from the first equation. Non-limiting examples of "solving" an equation include solving the equation in closed form or by numerical approximation or by optimization.

To compute "based on" specified data means to perform a computation that takes the specified data as an input.

Non-limiting examples of a "camera" include: (a) a digital camera; (b) a digital grayscale camera; (c) a digital color camera; (d) a video camera; (e) a light sensor, imaging sensor, or photodetector; (f) a set or array of light sensors, imaging sensors or photodetectors; (h) a light field camera or plenoptic camera; (i) a time-of-flight camera; and (j) a depth camera. In some cases, a camera includes any computers or circuits that process data captured by the camera.

The term "comprise" (and grammatical variations thereof) shall be construed as if followed by "without limitation". If A comprises B, then A includes B and may include other things.

Each of the following is a non-limiting example of a "computer", as that term is used herein: (a) a digital computer; (b) an analog computer; (c) a computer that performs both analog and digital computations; (d) a microcontroller; (e) a microprocessor; (f) a controller; (g) a tablet computer; (h) a notebook computer; (i) a laptop computer, (j) a personal computer; (k) a mainframe computer; and (l) a quantum computer. However, a human is not a "computer", as that term is used herein.

"Defined Term" means a term or phrase that is set forth in quotation marks in this Definitions section.

For an event to occur "during" a time period, it is not necessary that the event occur throughout the entire time period. For example, an event that occurs during only a portion of a given time period occurs "during" the given time period.

The term "e.g." means for example.

The fact that an "example" or multiple examples of something are given does not imply that they are the only instances of that thing. An example (or a group of examples) is merely a non-exhaustive and non-limiting illustration.

"For instance" means for example.

To say a "given" X is simply a way of identifying the X, such that the X may be referred to later with specificity. To say a "given" X does not create any implication regarding X. For example, to say a "given" X does not create any implication that X is a gift, assumption, or known fact.

"Herein" means in this document, including text, specification, claims, abstract, and drawings.

As used herein: (1) "implementation" means an implementation of this invention; (2) "embodiment" means an embodiment of this invention; (3) "case" means an implementation of this invention; and (4) "use scenario" means a use scenario of this invention.

The term "include" (and grammatical variations thereof) shall be construed as if followed by "without limitation".

Unless the context clearly indicates otherwise, "or" means and/or. For example, A or B is true if A is true, or B is true, or both A and B are true. Also, for example, a calculation of A or B means a calculation of A, or a calculation of B, or a calculation of A and B.

The term "such as" means for example.

Except to the extent that the context clearly requires otherwise, if steps in a method are described herein, then the method includes variations in which: (1) steps in the method occur in any order or sequence, including any order or sequence different than that described herein; (2) any step or steps in the method occur more than once; (3) any two steps occur the same number of times or a different number of times during the method; (4) one or more steps in the method are done in parallel or serially; (5) any step in the method is performed iteratively; (6) a given step in the method is applied to the same thing each time that the given step occurs or is applied to a different thing each time that the given step occurs; (7) one or more steps occur simultaneously; or (8) the method includes other steps, in addition to the steps described herein.

Headings are included herein merely to facilitate a reader's navigation of this document. A heading for a section does not affect the meaning or scope of that section.

This Definitions section shall, in all cases, control over and override any other definition of the Defined Terms. The Applicant or Applicants are acting as his, her, its or their own lexicographer with respect to the Defined Terms. For example, the definitions of Defined Terms set forth in this Definitions section override common usage and any external dictionary. If a given term is explicitly or implicitly defined in this document, then that definition shall be controlling, and shall override any definition of the given term arising from any source (e.g., a dictionary or common usage) that is external to this document. If this document provides clarification regarding the meaning of a particular term, then that clarification shall, to the extent applicable, override any definition of the given term arising from any source (e.g., a dictionary or common usage) that is external to this document. Unless the context clearly indicates otherwise, any definition or clarification herein of a term or phrase applies to any grammatical variation of the term or phrase, taking into account the difference in grammatical form. For example, the grammatical variations include noun, verb, participle, adjective, and possessive forms, and different declensions, and different tenses.

Variations:

This invention may be implemented in many different ways.

Each description herein of any method, apparatus or system of this invention describes a non-limiting example of this invention. This invention is not limited to those examples, and may be implemented in other ways.

Each description herein of any prototype of this invention describes a non-limiting example of this invention. This invention is not limited to those examples, and may be implemented in other ways.

Each description herein of any implementation, embodiment or case of this invention (or any use scenario for this invention) describes a non-limiting example of this invention. This invention is not limited to those examples, and may be implemented in other ways.

Each Figure, diagram, schematic or drawing herein (or in the Provisional) that illustrates any feature of this invention shows a non-limiting example of this invention. This invention is not limited to those examples, and may be implemented in other ways.

The above description (including without limitation any attached drawings and figures) describes illustrative implementations of the invention. However, the invention may be implemented in other ways. The methods and apparatus which are described herein are merely illustrative applications of the principles of the invention. Other arrangements, methods, modifications, and substitutions by one of ordinary skill in the art are also within the scope of the present invention. Numerous modifications may be made by those skilled in the art without departing from the scope of the invention. Also, this invention includes without limitation each combination and permutation of one or more of the items (including any hardware, hardware components, methods, processes, steps, software, algorithms, features, and technology) that are described herein.

What is claimed is:

1. A system for determining optical correction information of optical equipment, wherein the optical correction information is not known a priori, said system comprising a camera system, a target, toward which the camera system is directed, a detection area between the camera system and the target for receiving the optical equipment including at least one lens, and a processing system with a searching routine for determining at least one center of the at least one lens based on a plurality of images of the target acquired by the camera system as the target is viewed through the optical equipment in the detection area.

2. The system as claimed in claim 1, wherein the detection area includes an optically transparent surface on which the optical equipment may be placed.

3. The system as claimed in claim 1, wherein the target is a known distance from the camera system.

4. The system as claimed in claim 1, wherein the system further includes a position sensor to facilitate determining a position of the optical equipment.

5. The system as claimed in claim 1, wherein the searching routine employs iterative analysis of different resolutions of patterns responsive to the plurality of images.

6. The system as claimed in claim 1, wherein the searching routine employs iterative analysis of target images at different locations responsive to the plurality of images.

7. The system as claimed in claim 1, wherein the target includes a repeating pattern.

8. The system as claimed in claim 1, wherein the target includes a dynamic pattern that is changeable.

9. A method of determining optical correction information of optical equipment including at least one lens, wherein the optical correction information is not known a priori, said method comprising positioning the optical equipment in a detection area, the detection area located between a camera system and a target, capturing a plurality of images with the camera system, said plurality of images including an image of the target viewed through the optical equipment in the detection area, and determining at least one center of the lens using a searching routine based on the plurality of images of the target viewed through the optical equipment.

10. The method of claim 9, wherein the detection area includes an optically transparent surface on which the optical equipment may be placed.

11. The method of claim 9, wherein the target is a known distance from the camera system.

12. The method of claim 9, wherein the system further includes a position sensor to facilitate determining a position of the optical equipment.

13. The method of claim 9, wherein the searching routine employs iterative analysis of different resolutions of patterns responsive to the plurality of images.

14. The method of claim 9, wherein the searching routine employs iterative analysis of target images at different locations responsive to the plurality of images.

15. The method of claim 9, wherein the target includes a repeating pattern.

16. The method of claim 9, wherein the target includes a dynamic pattern that is changeable.

17. A system for determining optical correction information of optical equipment, wherein the optical correction information is not known a priori, said system comprising a camera system for capturing at least one camera image for capturing successive images, a target, toward which the camera system is directed, a detection area between the camera system and the target for receiving the optical equipment including at least one lens, and a processing system with a searching routine for determining at least one center of the at least one lens based on the successive images of the target as viewed through the optical equipment.

18. The system as claimed in claim 17, wherein the detection area includes an optically transparent surface on which the optical equipment may be placed.

19. The system as claimed in claim 17, wherein the searching routine employs iterative analysis of different resolutions of patterns responsive to the successive images.

20. The system as claimed in claim 17, wherein the searching routine employs iterative analysis of target images at different locations responsive to the successive images.

* * * * *